(12) United States Patent
Panchagnula et al.

(10) Patent No.: US 10,110,515 B2
(45) Date of Patent: Oct. 23, 2018

(54) PACKET SCHEDULING USING HIERARCHICAL SCHEDULING PROCESS

(71) Applicant: Xplaint, San Jose, CA (US)

(72) Inventors: Vamsi Panchagnula, San Jose, CA (US); Tsahi Daniel, Palo Alto, CA (US); Kegin Han, Fremont, CA (US)

(73) Assignee: Cavium, Inc., San Jose, CA (US)

( * ) Notice: Subject to any disclaimer, the term of this patent is extended or adjusted under 35 U.S.C. 154(b) by 210 days.

(21) Appl. No.: 14/542,350

(22) Filed: Nov. 14, 2014

(65) Prior Publication Data

US 2016/0142341 A1    May 19, 2016

(51) Int. Cl.
*H04L 12/937* (2013.01)
*H04L 12/861* (2013.01)

(52) U.S. Cl.
CPC ........ *H04L 49/254* (2013.01); *H04L 49/9005* (2013.01)

(58) Field of Classification Search
CPC .... H04L 49/254; H04L 49/9005; H04L 47/60
See application file for complete search history.

(56) References Cited

U.S. PATENT DOCUMENTS

| | | | |
|---|---|---|---|
| 7,724,760 B2 | 5/2010 | Balakrishnan et al. | |
| 9,641,465 B1 | 5/2017 | Gabbay et al. | |
| 2010/0278190 A1* | 11/2010 | Yip | H04L 47/60 370/412 |
| 2011/0038261 A1* | 2/2011 | Carlstrom | H04L 12/5693 370/230 |
| 2011/0261688 A1* | 10/2011 | Sharma | H04L 41/5022 370/230 |
| 2012/0020369 A1* | 1/2012 | Sundararaman | H04L 47/621 370/412 |
| 2015/0249620 A1* | 9/2015 | Folsom | H04L 45/566 370/392 |

OTHER PUBLICATIONS

Efficient Fair Queuing Using Deficit Round-Robin—M. Shreedhar and George Varghese IEEE/ACM Transactions on Networking vol. 4, No. 3 Jun. 1996.*

* cited by examiner

*Primary Examiner* — Jeffrey M Rutkowski
*Assistant Examiner* — Basil Ma

(57) ABSTRACT

System and method of data routing according to a hierarchical scheduling process. Incoming data traffic is allocated to various queues of a buffer. A scheduling tree has a top level for queues, a bottom level for egress ports, and a plurality of intermediate levels corresponding to different granularities with respect to service categories. Each queue is assigned to a particular node in each intermediate level of the scheduling tree. The scheduling tree traverses through multiple scheduling stages from the bottom to the top level to select a winner node in each level based on a variety of fairness and differentiating variables. As a result, a queue associated with the winner nodes in various levels is selected and data from the queue is read out and sent to the selected egress port for transmission.

20 Claims, 7 Drawing Sheets

PACKET SCHEDULING USING HIERARCHICAL SCHEDULING PROCESS

TECHNICAL FIELD

The present disclosure relates generally to the field of network data transmission, and, more specifically, to the field of scheduling mechanisms in data routing.

BACKGROUND

In a data switching network, data traffic is categorized into various flows which are stored in a number of virtual queues in a buffer. In a router or other network element, the stored queues typically compete for a common outgoing communications link or egress port (e.g., a physical communications link or a pseudo-wire). Thus, the buffered queues need to be scheduled on the egress side. Accordingly, a packet scheduling process is performed in the router to select which of the queued packets will be the next in line for outgoing transmission.

Typically, in a routing process, data packets coming in from different source ports are classified based on their source and destination ports and traffic types. They are subsequently sorted into different queues in the buffer. The state of each queue is updated when a packet enters into a queue. Based on the output port availability, the scheduler selects the right scheduling algorithm to dequeue the packets from the corresponding queues. The state of each queue will be updated when a packet moves out of a queue. The winner of each scheduling stage is recorded and considered for fairness in the next scheduling iteration.

Data transmission congestion possibly occurs due to oversubscription of an egress port, a limited transmission rate, or an unavailable or unready downstream receiving device, etc. In these scenarios, a scheduling process needs to provide traffic management, use fairness and service differentiation. For example, Quality of Service (QoS) algorithms are used to guarantee a preferential service for the high priority traffic, such as control traffic or voice/video latency sensitive traffic.

Conventionally, a scheduling process merely evaluates the state of the buffered queues to determine the order of allocating data packets to selected egress ports for transmission. This provides a single and fixed level of control granularity to achieve service differentiation or other desired features. Unfortunately, it lacks the ability of controlling QoS in other levels of granularities (e.g., based on Internet service provider, business entities, and user groups, etc.).

SUMMARY OF THE INVENTION

Therefore, it would be advantageous to provide a packet scheduling mechanism for data routing that offers the flexibility of controlling Quality of Service differentiation, use fairness and traffic management in multiple granularities.

Accordingly, embodiments of the present disclosure employ a user-configurable hierarchical scheduling process (or a scheduling tree) for scheduling packets at a network switching device. Incoming data packets are allocated to various queues of a buffer. The arbiter in the device is configured to perform a scheduling tree process. The scheduling tree has a top level corresponding to queues, a bottom level corresponding to egress ports, and a plurality of intermediate levels corresponding to different granularities with respect to service categories. Each queue is assigned to a particular node in each level of the scheduling tree. A scheduling cycle includes a sequence of scheduling stages.

At a particular scheduling stage, the arbiter is loaded with the relevant configuration and state information of all the upper nodes associated with a selected lower winner node. The arbiter chooses an upper winner node based on a variety of fairness and differentiating variables. As a result, a queue associated with the winner categories for the upper levels in is selected and data from the queue is read out and sent to the selected egress port for transmission.

By using a scheduling tree, Quality of Service can be advantageously differentiated in multiple granularities. In addition, because the nodes and the levels of a scheduling tree are user-configurable, the present disclosure offers the flexibility to conveniently adapt Quality of Service differentiation to users' needs without requiring complicated hardware and programming adaptations.

According to one embodiment of the present disclosure, a method of routing data traffic over a communication network includes mapping incoming data traffic into data groups and selecting an egress port of a data routing device. A respective data group is assigned to nodes of different levels in a scheduling tree. An upper node is selected according to a stage scheduling process based on values of a set of attributes associated with the upper node. The selected upper node is associated with a lower node that has been selected according to a prior stage scheduling process. A data group that is associated with selected nodes in the various levels of the scheduling tree is then selected. Data in the selected data group is sent to the selected egress port for transmission.

According to another embodiment of the present disclosure, an apparatus for routing data traffic over a communication network includes an egress port, a buffer unit, egress ports, first circuitry and scheduler circuitry. The ingress port is configured to receive data streams. The buffer unit is coupled to the ingress port and configured to store the data streams. The egress ports are coupled to the buffer unit and configured to transmit the data streams. The first circuitry is coupled to the ingress port and the buffer and configured to map incoming data traffic into data groups, where a respective data group is assigned to nodes of different levels in a scheduling tree. The scheduler circuitry is configured to: select an egress port of the apparatus; select an upper node according to a stage scheduling process based on values of a set of attributes associated with the upper node, and select a data group associated with selected nodes in various levels of the scheduling tree. The selected upper node is associated with a lower node that has been selected according to a prior stage scheduling process.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
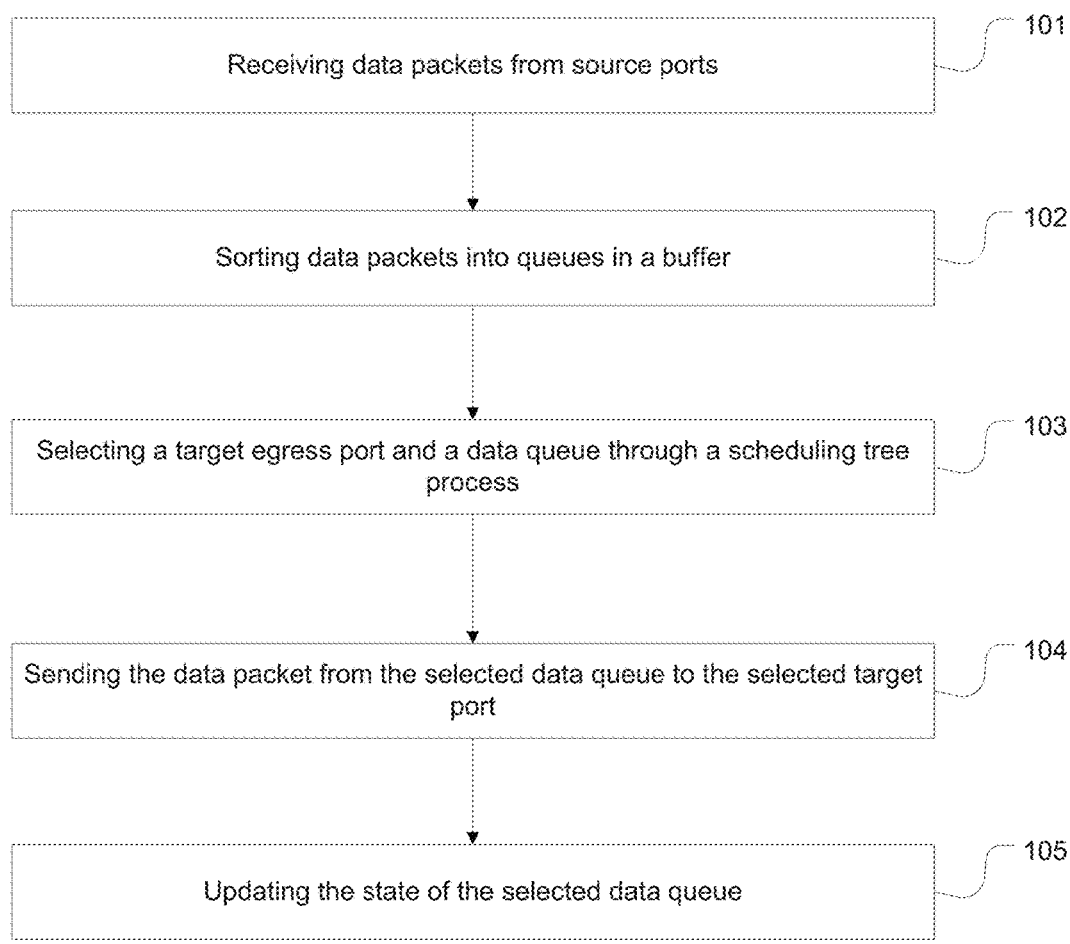
FIG. 1 is a flow chart depicting an exemplary method of scheduling outgoing packets using a scheduling tree in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation And Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Packet Scheduling Using Hierarchical Scheduling Process

Overall, embodiments of the present disclosure utilize a scheduling tree (or a hierarchical scheduling process) to schedule outgoing packets at a data routing device. Incoming data traffic is mapped to various queues of a buffer. Each queue is assigned to a particular node in each level of the scheduling tree, and thus the queues are defined as leaves of the scheduling tree. The scheduling tree first selects an available egress port and then sequentially selects a winner node for each level from the root (egress port level) to the leaves of the scheduling tree. As a result, a queue associated with the winner nodes in various levels is selected and data from the queue is dequeued and sent to the selected egress port for transmission.

FIG. 1 is a flow chart depicting an exemplary method 100 of scheduling outgoing packets using a scheduling tree in accordance with an embodiment of the present disclosure. In some embodiments, the method 100 is performed by circuitry in a data routing device, such as a router, switch, a hub, etc. In some other embodiment, the method 100 is implemented as a computer program executable by a processor, for example in a software-defined network (SDN).

At step 101, data packets are received from different source ports of the device. The data packets are sorted into multiple virtual queues in a buffer at step 102. When a new data packet is received at a particular queue, the state of the queue is updated. Based on user-configuration, each queue is assigned to a particular node in each level of a scheduling tree. Thus, the queues are defined as the leaves of the scheduling tree. In some embodiments, the queues are classified in multiple granularities, such as based on user group, user type, user's role, data type, or any other criteria that a system administrator sees fit. Thus, each level of the scheduling tree corresponds to a classification granularity of the queues. At step 103, a scheduling tree process is performed to select a target egress port and a data queue from the buffer. As to be described in greater detail below, the scheduling process includes a sequence of scheduling stages to select winner nodes in the plurality of levels. In each scheduling stage, a winner node is selected in accordance with specific scheduling criteria or scheduling algorithm.

At step 104, the data packets in the selected queue is dequeued and sent to the selected target port for transmission. When a packet moves out from the selected queue, the state of each queue is updated at step 105. The foregoing steps 103-106 are repeated for each scheduling cycle. The winner queue of each scheduling stage is recorded to be considered in the next scheduling iteration.

According to the present disclosure, by performing a sequence of scheduling stages to select service categories in various levels, use fairness, differentiating service quality and traffic management can be controlled in more than one granularity. In addition, because a scheduling tree is user-configurable through a user interface, the scheduling process according to the present disclosure advantageously offers the flexibility for users to adapt the aforementioned control to varying business needs, customized policies, etc.

Figure 2:
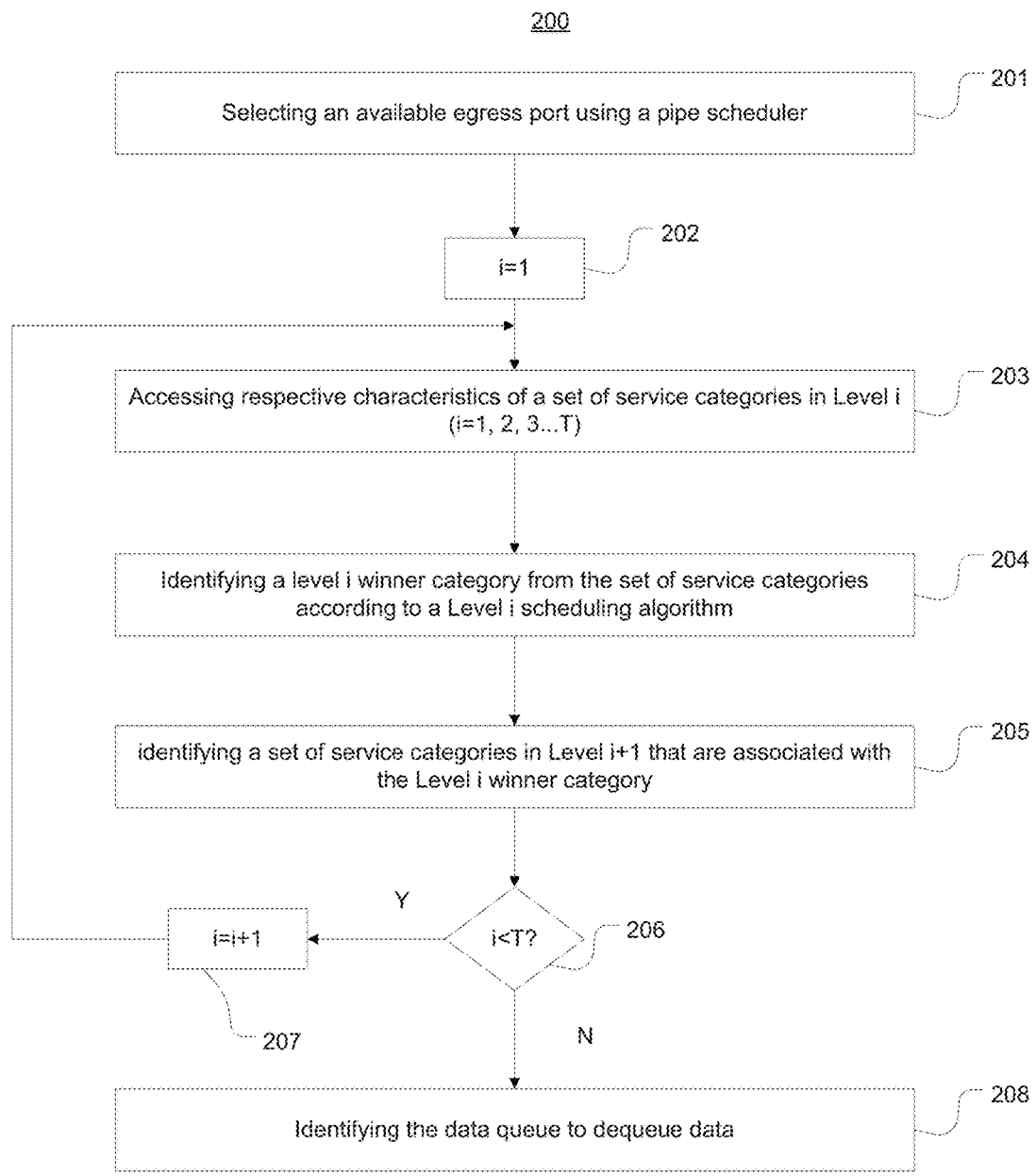
FIG. 2 is a flow chart depicting an exemplary hierarchical scheduling process in accordance with an embodiment of the present disclosure.

FIG. 2 is a flow chart depicting an exemplary hierarchical scheduling process 200 in accordance with an embodiment of the present disclosure. The process 200 corresponds to steps 103 and 104 in FIG. 1. In the present embodiment, the root of the scheduling tree represents egress ports for outgoing data transmission. The intermediate nodes represent service categories defined in a variety of granularities, and the leaves represent data queues in the buffer. As illustrated, "T" denotes the number of intermediate levels in the scheduling tree. Accordingly, the scheduling tree 200 encompasses a sequence of scheduling stages for selecting winners from the root level to the leaf level.

In the present embodiment, the scheduling tree process is configured to enforce use fairness, service differentiation and traffic management at the data routing device. Accordingly, each service category or queue assigned to the scheduling tree is characterized with respect to a set of attributes related to these desired features, as will be described in greater detail below. Thus, at each scheduling stage, an individual scheduling process is performed to evaluate the involved nodes in a corresponding level against the set of attributes.

At 201, at the scheduling stage configured for the root level, a pipeline scheduling process (the first stage scheduler) is performed to select an available target egress port for data transmission. At 202, the level index "i" is set to 1. According to the configuration of the scheduling tree, the selected egress port is associated with one or more service categories (candidate categories) in level 1 ("L1"). Thus, at the second scheduling stage, the respective characteristics of the candidate categories in level 1 are accessed at step 203. At step 203, a level 1 scheduler is performed to evaluate the characteristics of the candidate categories and thereby select a particular service category as a winner for level 1.

Similarly, one or more service categories in level 2 that belong to the subtree of the level 1 winner category are identified at step 205. Then "i" is incremented at step 207, and the foregoing steps 203-205 are iterated for each intermediate level to select a winner category thereof until "i" is equal to "T" at step 206. In the last scheduling stage, a stage scheduling process is performed at step 208 to select a data queue from the queues associated with the winner category of level T.

It will be appreciated that various suitable techniques or methods that are well known in the art can be used to implement a scheduling process at each scheduling stage without departing from the scope of the present disclosure. Further, different scheduling stages in a scheduling tree may utilize the same or different scheduling schemes, such as Round-Robin scheduling, Weighted Round Robin scheduling, Deficit Weighted Round Robin (DWRR), etc.

Figure 3:
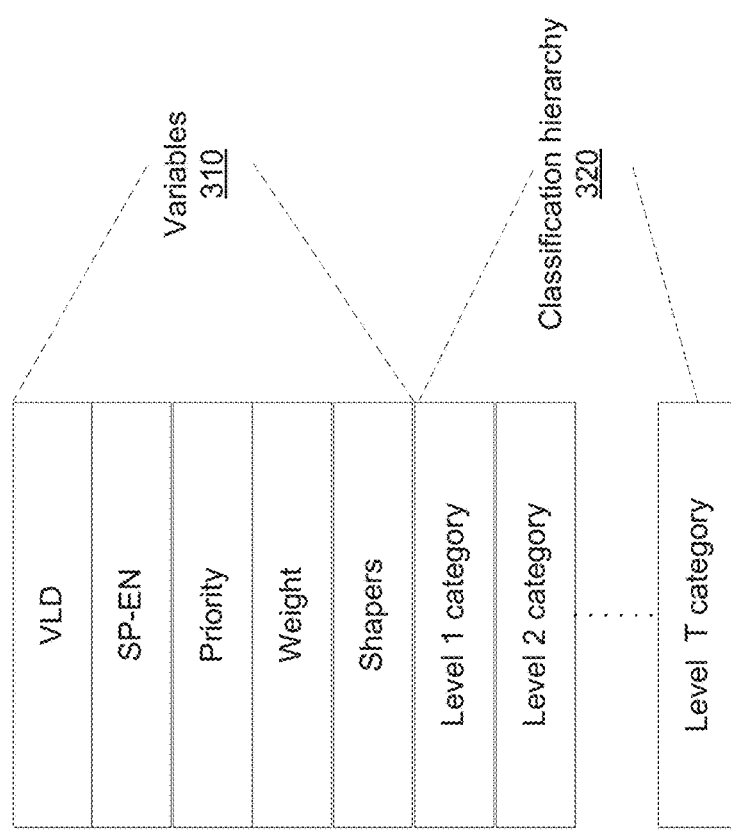
FIG. 3 illustrates the information associated with a packet queue which is used in a scheduling process in accordance with an embodiment of the present disclosure.

Each node of the scheduling tree is associated with programmable information used as input to a stage scheduler during the corresponding scheduling stage, such as information needed to enforce user fairness, service differentiation and traffic management. In some embodiments, a scheduling process at a particular scheduling stage includes a Deficit Weighted Round Robin (DWRR) process which involves evaluating variables indicating strict priority enable, priority, weight, token bucket, credit bucket shapers, and etc. FIG. 3 illustrates the information associated with a packet queue and used in a scheduling tree process in accordance with an embodiment of the present disclosure. As shown, the packet queue is assigned with values of a set of variables 310 representing hardware validity status (VLD), strict priority enable (SP-EN), priority, weight, and shaper. Moreover, the packet queue is assigned to a particular service category in each level of the classification hierarchy 320, e.g., Level 1 category, Level 2 category.

Figure 4A:
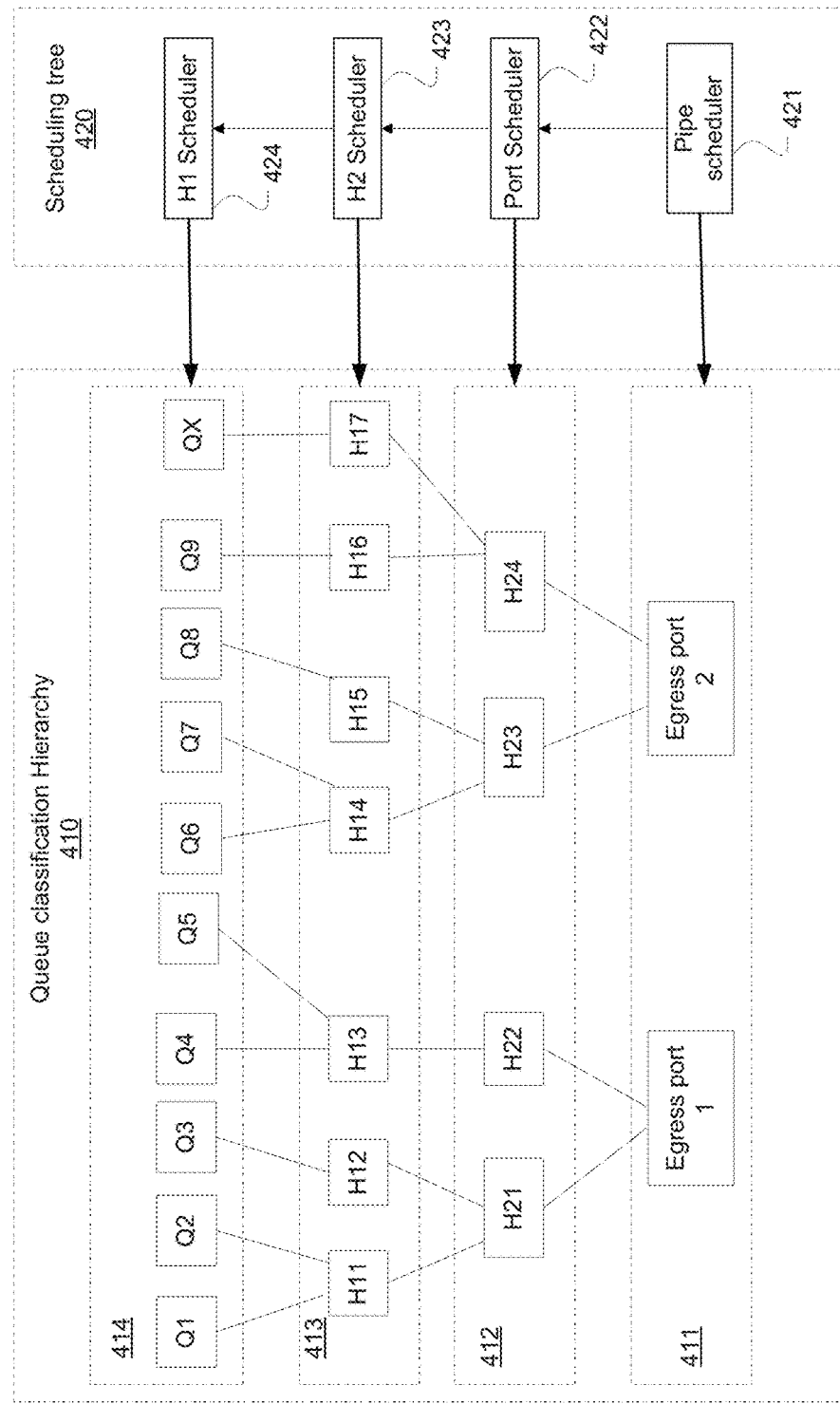
FIG. 4A illustrates the logic relationship between an exemplary classification hierarchy and the corresponding scheduling tree configuration in accordance with an embodiment of the present disclosure.

Thus, the data packets are classified based on a classification hierarchy. FIG. 4A illustrates the logic relationship between an exemplary classification hierarchy 410 and the corresponding scheduling tree 420 configuration in accordance with an embodiment of the present disclosure. The hierarchy 410 has four levels: the egress port level 411, a H2 level 412, a H1 level 413 and the queue level 414. The intermediate levels H1 and H2 are defined to achieve service differentiation in the corresponding granularities. For instance, the H2 level 412 is configured to represent the Internet service providers (e.g., Comcast, AT&T, etc.), while the H1 level 413 is configured to represent business entities utilizing the provided services. Each H1 level category (e.g., H11, H12, . . . , H17) is directly associated with an H2 level category (e.g., H21, H22, . . . , H24), and each queue (e.g., Q1, . . . QX) is directly associated with an H1 level category. The structure of the classification hierarchy 410 is user configurable via a user interface.

Correspondingly, in a scheduling cycle, the scheduling tree 420 traverses through four scheduling stages (or decision nodes) 421-424 to select a winner in each level of the hierarchy 410. In each scheduling stage, the relevant configuration and state information of all the lower nodes that are connected with the selected upper level winner are accessed and evaluated. In a scheduling cycle, the pipeline scheduler 421 is first performed to select a winner egress port, e.g., based on availability or any other suitable scheduling scheme. The port scheduler 422 is performed next to select a H2 winner from the categories associated with the winner port. The H2 scheduler 423 is then triggered to select a H1 winner from the categories associated with the H2 winner. Last, the H1 scheduler 424 is performed to select a winner queue from the queues associate with the H1 winner.

It will be appreciated that stage schedulers 421-424 may be configured to perform the same or different scheduling schemes and thus evaluate the same set or different sets of variables. In some embodiments, the scheduling tree chooses a relevant lower level winner based on a variety of fairness and differentiating variables.

In some embodiments, each member in the queue level, H1 level and H2 level is associated with a respective set of values of the variables 310 in FIG. 3. The port scheduler, H2 scheduler and H1 scheduler select respective winners based on the corresponding values of variables. In some embodiments, the set of values for an upper level node is derived from the values associated with its subtree nodes. For example, the priority value for H22 is equal to the greater of H11 and H12 priority values.

Figure 4B:
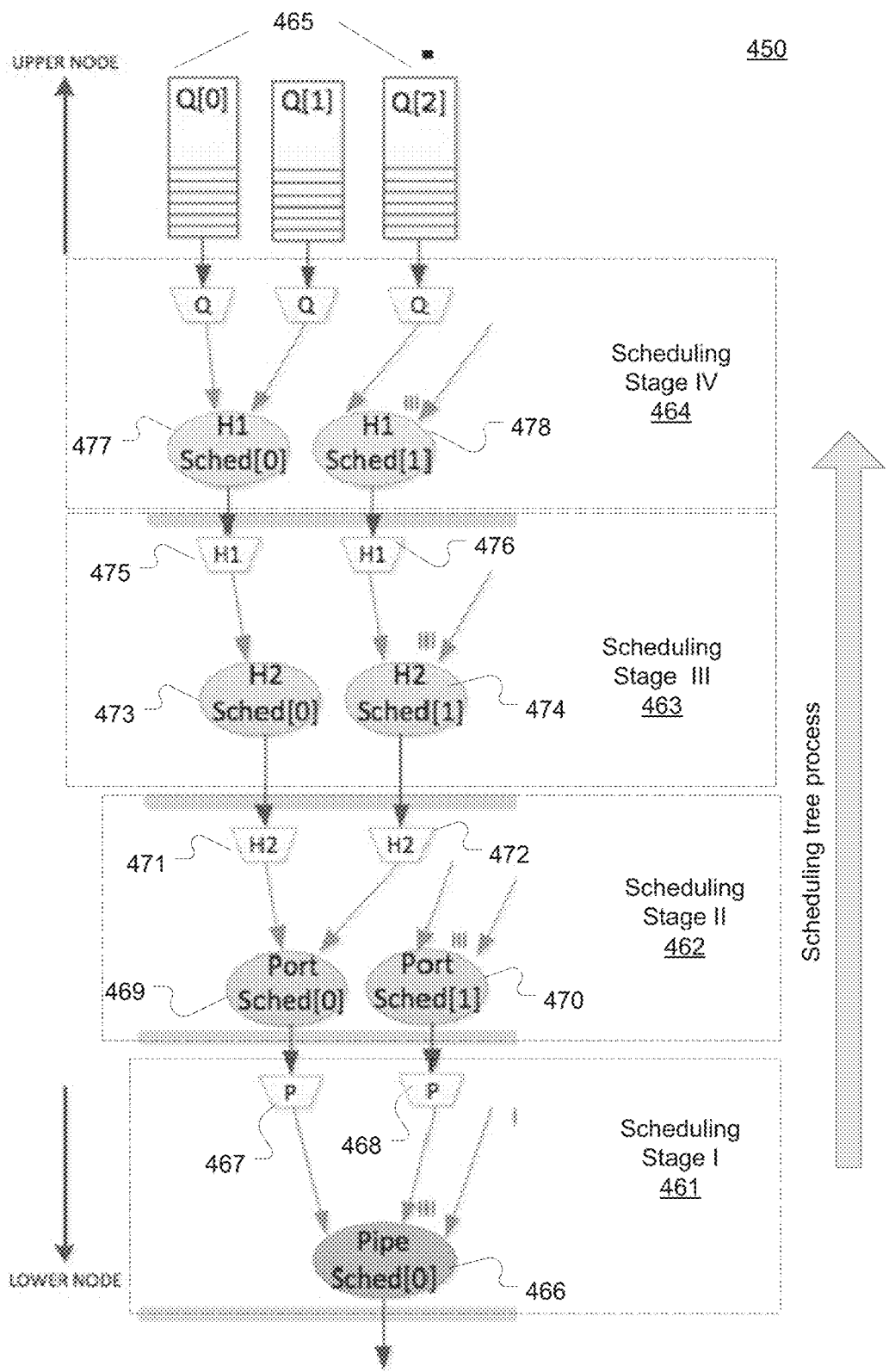
FIG. 4B illustrates the logic of an exemplary scheduling tree implemented in a data routing device in accordance with an embodiment of the present disclosure.

FIG. 4B illustrates the logic of an exemplary scheduling tree 450 implemented in a data routing device in accordance with an embodiment of the present disclosure. Similar with the scheduling tree in FIG. 4A, the scheduling tree 450 includes scheduling stages 461-464 for the egress port level, the H2 level, the H1 level and the queue level, respectively. Packets are stored in the buffer in various queues 465. The queues are assigned to a particular H1 node, H2 node and an egress port by user configuration.

In each scheduling stage, the relevant configuration and state information of all the lower nodes that are connected with the selected upper level winner are accessed and evaluated. The scheduling tree chooses a relevant lower level winner based on a variety of fairness and differentiating variables.

More specifically, starting from the root of the scheduling tree, the pipeline scheduler 466 evaluates relevant information associated with the egress ports 467 and 468 and thereby selects a winner port, e.g., based on availability or a Round-Robin scheduling process. If the port 467 is the winner, at the second scheduling stage 462, the port scheduler 469 logically attached to the port 467 evaluates the H2 nodes 471 and 472 and thereby selects a winner H2 node. On a different scenario, if the port 468 is selected as the winner port at the first stage 461, the port scheduler 470 logically attached to the port 468 evaluates a different set of H2 nodes (not explicitly shown) to select a H2 winner.

In terms of hardware configuration, the port scheduler can be implemented as a single function unit which becomes logically attached to the subtree of a winner port upon the port being selected by the pipeline scheduler. When attached, the function unit is loaded with the relevant configuration and state information of the subtree of the winner. However, in some other embodiments, the port scheduler includes a separate function unit attached to the subtree of each port, where a function unit is activated to perform a scheduling process once the corresponding port is selected as a winner.

Once an H2 node is selected as a winner (e.g., category 472), the scheduling tree progresses to the third scheduling stage 463 in which a H2 scheduler (e.g., scheduler 474) logically attached to the winner H2 node evaluates the relevant H1 nodes (including category 476) to select a H1 winner. At the last stage 464, the H1 scheduler (e.g., scheduler 478) logically attached to the winner H1 node (e.g., category 476) evaluates the relevant queues to select a winner queue. Then packets in the winner queue is dequeued and sent to the winner egress port (e.g., port 468) for transmission. Similarly, each of the H1 scheduler and the H2 scheduler can be implemented as a single hardware function unit that operate in different modes depending on the selection of the winner node. Alternatively, it can be implemented as multiple function units selectively activated depending on the selection of the winner node.

Figure 5:
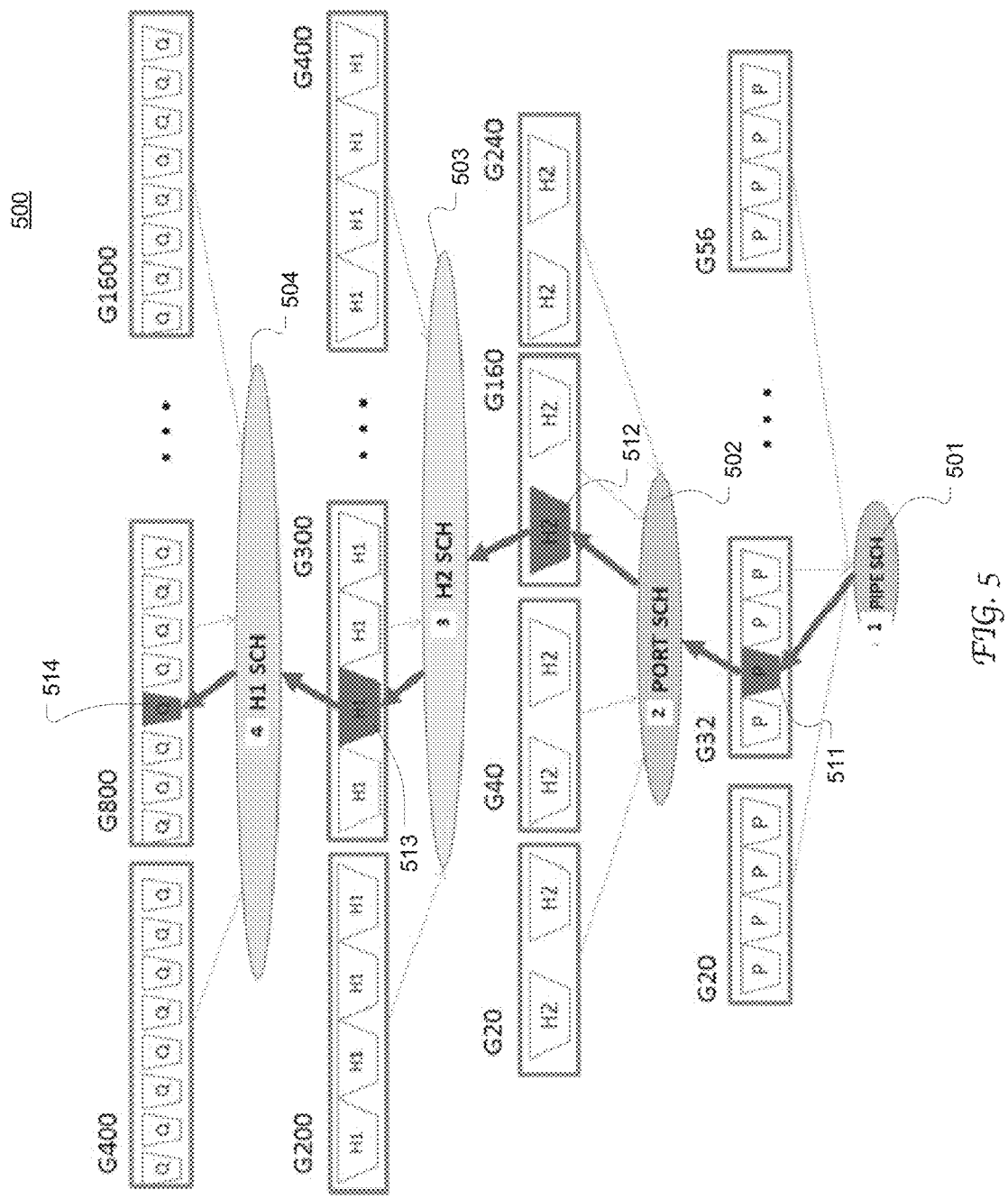
FIG. 5 illustrates an exemplary scheduling tree process performed by a data routing device in accordance with an embodiment of the present disclosure.

FIG. 5 illustrates an exemplary scheduling tree process 500 performed by a data routing device in accordance with an embodiment of the present disclosure. As shown, the pipeline scheduler 501 chooses a particular port Px 511 which triggers the port scheduler 502. The port scheduler then chooses a particular H2x 512 that is logically attached to Px. The H2 scheduler 503 chooses a particular H1x 513 that is logically attached to H2x 512, which triggers the H1 scheduler 504. The H1 scheduler 504 chooses a particular queue Qx 514 which triggers the token read stage where a token is read out of the token buffer memory based on the Qx head pointer and transmitted at the egress port Px 511. Once a packet is transmitted, the state of the queue Qx 514 is updated and the scheduling process 500 is repeated.

In FIG. 5, the members in each level of the classification hierarchy are grouped into clusters for ease of communicating the hierarchical tree structure from one level to the other. Members of each cluster are programmed individually with respect to a set of variables, e.g., the variables 310 in FIG. 3.

Figure 6:
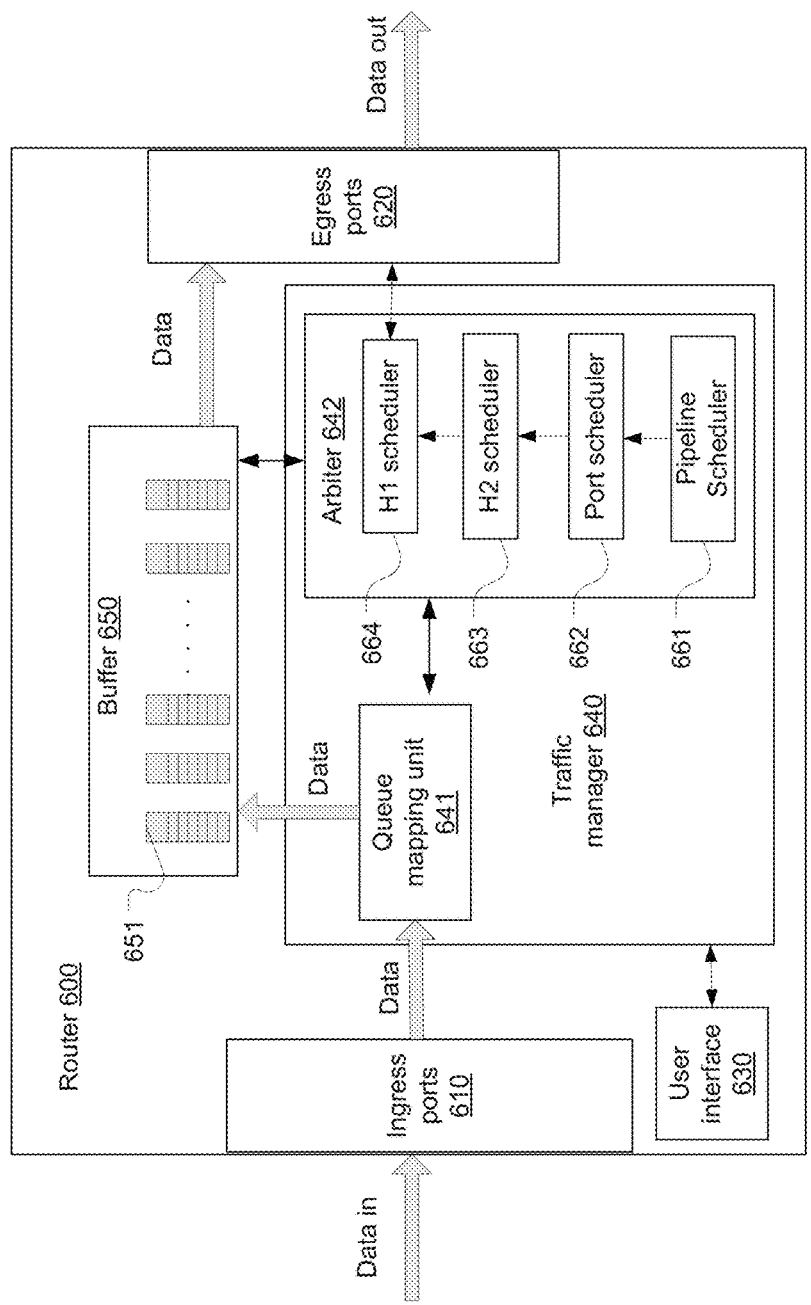
FIG. 6 is a block diagram illustrating the configuration of an exemplary router capable of scheduling packets using a scheduling tree process in accordance with an embodiment of the present disclosure.

FIG. 6 is a block diagram illustrating the configuration of an exemplary router 600 capable of scheduling packets using a scheduling tree process in accordance with an embodiment of the present disclosure. The router 600 includes ingress ports 610, egress ports 620, a buffer 650 having a plurality of queues 651, a user interface logic 630 and a traffic manager 640. The traffic manager 640 encompasses s a queue mapping unit 641 and an arbiter 642.

The user interface logic 630 renders a user interface 430 for receiving user input to configured a classification hierarchy, classify the queues based on a classification hierarchy and/or assign them to nodes in a the various levels of the scheduling tree, etc., as presented in greater detail above.

During operation, data traffic is received at the input ports 610 and allocated into various queues 651 of the buffer 650 by the queue mapping unit 641. The arbiter 620 schedules packets in a sequence of scheduling stages which respectively correspond to the plurality of levels of the classification hierarchy. In the illustrated example, the arbiter 642 includes a pipeline scheduler 661, a port scheduler 662, a H2 scheduler 663 and a H1 scheduler 664. Upon a winner queue is determined through the scheduling tree process performed by the arbiter 642, data in the queue is read out and sent to the selected egress port for outgoing transmission.

The present disclosure is not limited by the configuration or design of various components in the router device 600. Particularly, an arbiter or a stage scheduler can be implemented using any suitable technique, process, or circuitry design that is well known in the art. The multiple schedulers 661-664 in the arbiter 642 can be implemented as an integrated scheduling engine that operates in different modes at different scheduling stages. Alternatively, the arbiter 642 may include a separate function module for each stage scheduler that is activated once a prior scheduling stage is finished.

It will be appreciated that the circuitry shown in the router 600 can be implemented as application specific integrated circuits (ASIC), application-specific standard parts (ASSPs), System-on-Chip (SoC), field-programmable gate arrays (FPGAs), etc. Further, it will be appreciated that the router may include various other functions and components that are well known in the art.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of routing data traffic over a communication network, said method comprising: mapping incoming data traffic into data groups based on service categories, wherein a respective data group is assigned to nodes of different levels in a scheduling tree, wherein said scheduling tree comprises:
a bottom root level, wherein each node in said root level represent a respective egress port of a plurality of egress ports of said data routing device; a plurality of intermediate levels; and a top level, wherein each node in said top level represents a respective data group of said data groups, wherein said respective data group corresponds to a queue, traversing said scheduling tree from said bottom level to said top level, wherein said traversing comprises:
selecting an egress port from said plurality of egress ports of said data routing device; responsive to a selection of said egress port, selecting an upper node in a first intermediate level of said scheduling tree according to a scheduling process based on values of a set of attributes associated with said upper node, wherein said upper node is associated with a lower node in a second intermediate level of said scheduling tree that has been selected according to a prior scheduling process, wherein selected nodes at different intermediate levels in the scheduling tree correspond to respective data groups based on service categories in different granularity levels; responsive to said selection of said egress port and responsive to selections of nodes in said plurality of said intermediate levels, selecting a data group from the data groups; and sending data in said data group to said egress port for transmission.

2. The method as described in claim 1, wherein said set of attributes are related to fairness, differentiation and traffic management of network data transmission.

3. The method as described in claim 2, wherein said scheduling process comprises a Deficit Weighted Round Robin (DWRR) process.

4. The method as described in claim 3, wherein said set of attributes represents strict priority enable, priority, weight, and token bucket.

5. The method as described in claim 1, further comprising buffering said incoming data traffic, wherein said data groups correspond to queues in a buffer.

6. The method as described in claim 1, wherein said selecting said egress port comprises selecting said egress port in accordance with a pipeline scheduling process.

7. The method as described in claim 1, further comprising rendering a user interface configured to receive user input for assigning said respective data group to said nodes of different levels in said scheduling tree.

8. An apparatus for routing data over a communication network, said apparatus comprising:
an ingress port configured to receive data streams;
a buffer unit coupled to the ingress port and configured to store said data streams;
a plurality of egress ports coupled to the buffer unit and configured to transmit said data streams;
a first circuitry coupled to the ingress port and the buffer unit and the first circuitry configured to map incoming data traffic into data groups based on service categories, wherein a respective data group is assigned to nodes of different levels in a scheduling tree; and
scheduler circuitry coupled to said first circuitry and configured to:
select an egress port from the plurality of egress ports, wherein the plurality of egress ports correspond to a single level of said scheduling tree;
responsive to a selection of said egress port, select an upper node of said scheduling tree according to a scheduling process based on values of a set of attributes associated with said upper node, wherein said upper node of said scheduling tree is associated with a lower node of said scheduling tree that has been selected according to a prior scheduling process, wherein selected nodes at different levels of said scheduling tree correspond to data groups based on service categories in different granularity levels; and responsive to a selection of said egress port and responsive to selections of nodes in intermediate levels of said scheduling tree, select a data group from the data groups, the selected data group corresponding to a queue associated with the selected nodes of said scheduling tree.

9. The apparatus as described in claim 8, wherein said set of attributes are related to fairness, differentiation and traffic management of network data transmission.

10. The apparatus as described in claim 9, wherein said set of attributes comprises strict priority enable, priority, and credit bucket shaper.

11. The apparatus as described in claim 8, wherein said scheduling process comprises a Deficit Weighted Round Robin (DWRR) process.

12. The apparatus as described in claim 8, wherein said first circuitry and said scheduler circuitry are integrated in an Application-Specific Integrated Circuit (ASIC).

13. The apparatus as described in claim 8, wherein said egress port is selected in accordance with a pipeline scheduler process.

14. The apparatus as described in claim 8, further comprising circuitry configured to render a user interface, said user interface configured to receive user input for assigning said respective data group to said nodes of different levels in said scheduling tree.

15. A method of scheduling data traffic at a data routing device, said method comprising:
mapping incoming data traffic into data groups in a buffer, wherein said data groups are classified based on a hierarchy, wherein:
a bottom level of said hierarchy corresponds to a plurality of egress ports, an intermediate level of said hierarchy comprises a plurality of categories and a respective category in said intermediate level has a subordinate category; and
a top level of said hierarchy corresponds to queues in said buffer; and scheduling data transmission from selected queues in said buffer to a selected egress port of said data routing device in accordance with a scheduling tree process, wherein said scheduling tree process comprises traversing from said bottom level to said top level, the egress port initially being selected from the plurality of egress ports at said bottom level of said hierarchy, the queues being selected at said top level of said hierarchy, and categories being selected at respective levels of said hierarchy, wherein said selected categories at different levels of said hierarchy correspond to data groups based on service categories associated with said selected egress port and in different granularity levels.

16. The method as described in claim 15, wherein said egress port of said data routing device is selected in accordance with a pipeline scheduling process.

17. The method as described in claim 16, further comprising:
selecting a category for a respective level of said hierarchy according to a scheduling process based on values of a set of attributes associated with categories in said respective level, wherein said category is a subordinate category of a category that has been selected according to a prior scheduling process;
selecting a data group associated with said selected categories in said hierarchy; and
sending data in said selected data group to said egress port for transmission.

18. The method as described in claim 17, wherein said set of attributes are related to fairness, differentiation and traffic management of network data transmission.

19. The method as described in claim 18, wherein said set of attributes comprise variables representing strict priority enable, priority, and credit bucket shaper.

20. The method as described in claim 18, wherein said scheduling process comprises a Deficit Weighted Round Robin (DWRR) process.

* * * * *